United States Patent [19]

Fawcett

[11] Patent Number: 5,768,526
[45] Date of Patent: Jun. 16, 1998

[54] METHOD AND APPARATUS FOR VALIDATING DATA PACKETS IN A PAGING SYSTEM

[75] Inventor: Glenn S. Fawcett, Vancouver, Canada

[73] Assignee: Glenayre Electronics, Inc., Charlotte, N.C.

[21] Appl. No.: 612,748

[22] Filed: Mar. 8, 1996

[51] Int. Cl.⁶ .......................... G06F 15/17; G06F 13/38; G06F 7/04; H04L 9/32
[52] U.S. Cl. ..................... 395/200.59; 395/200.36; 395/187.01; 380/49; 340/825.34
[58] Field of Search ................ 395/200.18, 200.5, 395/200.12, 200.06, 187.01, 222.5, 200.36, 200.55, 200.59, 200.68, 421.06, 200.76; 380/49; 370/338, 313; 364/949.71, 260.81; 340/825.44, 825.34

[56] References Cited

U.S. PATENT DOCUMENTS

| | | | |
|---|---|---|---|
| 4,919,545 | 4/1990 | Yu | 395/200.55 |
| 5,204,961 | 4/1993 | Barlow | 395/187.01 |
| 5,226,079 | 7/1993 | Holloway | 380/49 |
| 5,247,519 | 9/1993 | Snowden et al. | 370/313 |
| 5,283,832 | 2/1994 | Lockhart, Jr. et al. | 380/49 |
| 5,329,623 | 7/1994 | Smith et al. | 395/187.01 |
| 5,406,557 | 4/1995 | Baudoin | 395/200.36 |
| 5,444,782 | 8/1995 | Adams, Jr. et al. | 380/49 |
| 5,448,641 | 9/1995 | Pintsov et al. | |
| 5,483,595 | 1/1996 | Owen | 380/49 |
| 5,487,100 | 1/1996 | Kane | 395/200.36 |
| 5,495,580 | 2/1996 | Osman | 395/187.01 |
| 5,557,749 | 9/1996 | Norris | |
| 5,583,940 | 12/1996 | Vidrascu et al. | 380/49 |
| 5,608,786 | 3/1997 | Gordon | |
| 5,623,605 | 4/1997 | Keshav et al. | |
| 5,635,918 | 6/1997 | Tett | 340/825.44 |

*Primary Examiner*—Mark H. Rinehart
*Attorney, Agent, or Firm*—Christensen, O'Connor, Johnson & Kindness PLLC

[57] ABSTRACT

A method of validating communications between a transmitting component and a receiving component of a paging system is disclosed. The transmitting component prepares an application protocol data unit (APDU) for transmission by selecting predetermined portions of the APDU for hashing. A hash code is output by the hash method and included in the APDU. The receiving component retrieves the same predetermined portions of the APDU for hashing. The receiving component then compares the hash code in the APDU with the hash code the receiving component calculated. If there is a match, then the APDU is accepted as authentic. If there is not a match, then the APDU is rejected.

13 Claims, 7 Drawing Sheets

METHOD AND APPARATUS FOR VALIDATING DATA PACKETS IN A PAGING SYSTEM

FIELD OF THE INVENTION

The present invention relates to multi-component paging systems, and more particularly, to a secure communication method and apparatus in the paging system.

BACKGROUND OF THE INVENTION

Over the past several years, the proliferation of paging systems has been extraordinary. Evolving from the basic alphanumeric one-way paging system to voice two-way systems, "traditional" one-way paging systems have changed beyond their initial scope of use. For a discussion of a one-way paging system, the reader is directed towards U.S. Pat. Nos. 5,481,258 to Fawcett et al. and 5,365,569 to Witsaman et al., commonly assigned to the assignee herein and incorporated by reference.

All paging systems, however, include basic components including paging transmitters, paging terminals, transmitter controllers, and pagers. For a two-way system, the paging system will also include paging receivers. The paging transmitters, paging terminals, transmitter controllers, and paging receivers are collectively referred to as paging infrastructure equipment. For a large paging system, multiple paging terminals and paging transmitters are required. Typically, the components of a paging system are placed at different geographic locations, perhaps even thousands of miles apart.

One crucial requirement of any paging system is the ability to communicate information between the various components of the paging system. Those skilled in the art will recognize that data packets containing, among other information, paging messages must be sent from the paging terminal(s) to the paging transmitters. In addition, information of various kinds will be sent periodically from the paging transmitters to the paging terminals. In large paging systems, often times, data packets will be transferred between two paging terminals.

It has also been a trend in the paging industry to have various paging service providers share portions of their paging infrastructure equipment. In such a case, each paging service provider may have its own paging terminal and share the paging transmitters and paging controllers. In other circumstances, one paging service provider may simply "rent" airtime on another paging service provider's paging system. This is commonly done when each paging service provider has a paging system that has coverage in a separate and distinct geographic locale. In order for each paging service provider to expand its geographic coverage, each paging service provider will rent airtime on the other paging service provider's paging system. In such a case, the paging terminals of each paging service provider must be able to effectively communicate with the paging terminals of the other paging service provider.

In the prior art, the communications between paging infrastructure equipment used what is known in the industry as an "IP" (Internet Protocol) datagram network for data communication between the paging infrastructure equipment. This allows use of standard data communications equipment because the IP group of protocols is widely used.

However, this also presents a large security problem. In certain types of paging systems, the paging system is connected to the Internet in order to accept paging messages via electronic mail or the World Wide Web. A malicious party could inject erroneous IP datagrams into the paging system.

Even if the paging system is not connected to the Internet, a malicious party could, if motivated, inject erroneous IP datagrams into the paging system that may mimic normal authorized data communications traffic between paging infrastructure equipment, causing unexpected results.

SUMMARY OF THE INVENTION

A method for validating a data packet transmitted between components of a paging system is disclosed. The paging system includes at least one transmitting component and one receiving component. First, predetermined portions of the data packet are extracted for hashing by the transmitting component. Next, a novel hash method is performed on the predetermined portions of the data packet to generate a transmit hash code. The hash code is inserted into the data packet and the data packet is transmitted to the receiving component. At the receiving component, the same predetermined portions of the data packet are extracted and hashed using the same hash method. The receiving component produces a receive hash code. The receive hash code is compared with the transmit hash code and, if there is a match between the receive hash code and said transmit hash code, the data packet is accepted.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
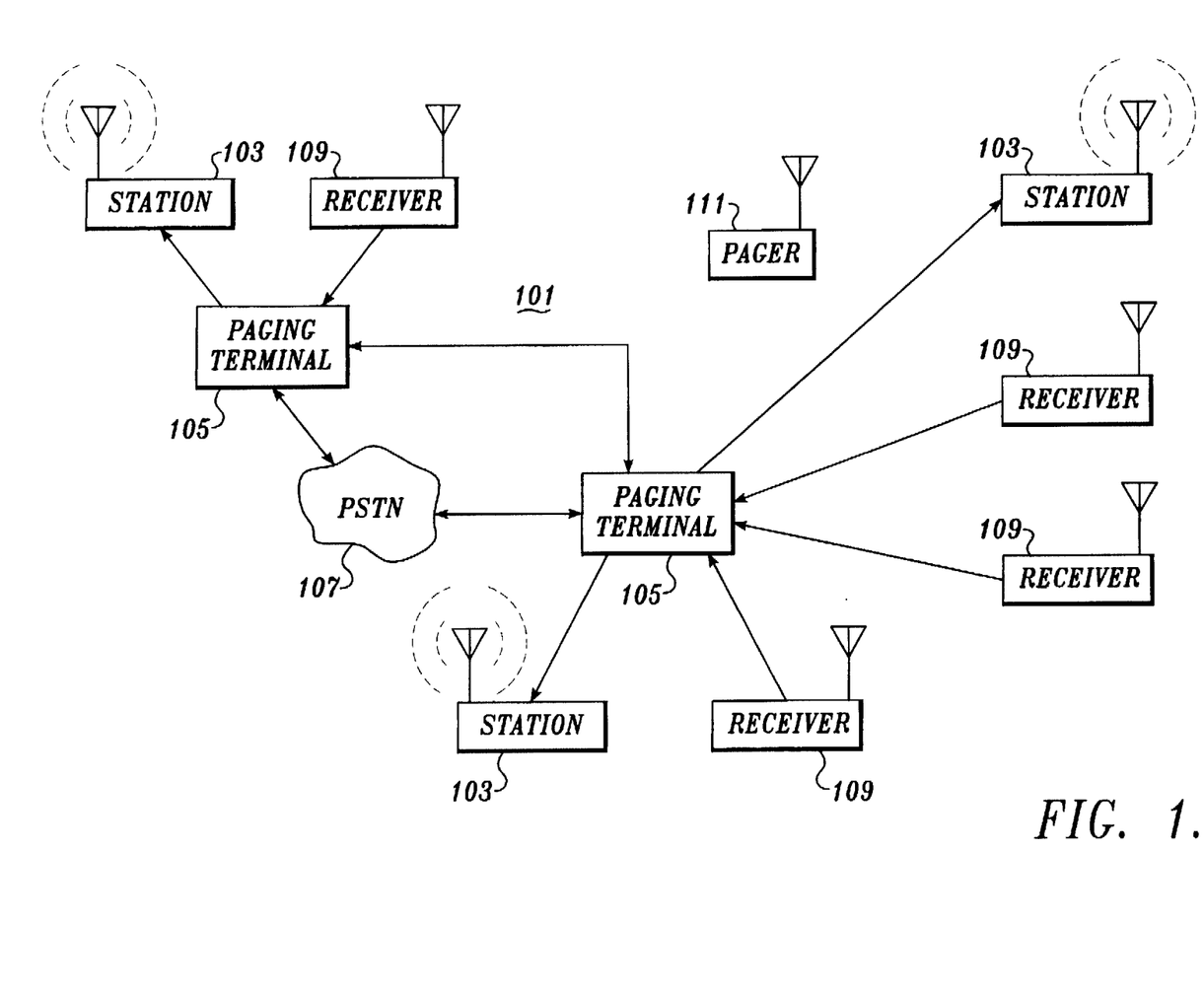
FIG. 1 is a schematic diagram of a typical paging system.

FIG. 1 shows a paging system 101 that includes paging stations 103, paging terminals 105, public switched telephone network (PSTN) 107, paging receivers 109 and pager 111. It can be appreciated by those skilled in the art that while only two paging terminals 105 are shown, a paging system may include many paging terminals. Likewise, the number of other components of the paging system 101 are merely illustrative. Indeed, paging systems can be grown or shrunk to meet consumer demand.

The paging stations 103 are also referred to as base stations or paging transmitters. In operation, callers who wish to page a subscriber use the PSTN 107 to call the subscriber's pager telephone number. Alternatively, pages can be originated through a computer network, such as the Internet, directly connected to a paging terminal.

Additionally, pages can be originated by another paging terminal (not shown) that is "renting" the paging system 101.

The call is routed from the PSTN 107 to paging terminal 105 which formulates a page. The page is distributed over a communications network to other paging terminals 105 and to a set of paging stations 103. The paging stations 103 in turn transmit the page throughout the geographic coverage area of the paging system 101.

The paging system 101 may include thousands of fixed location paging stations 103 that are connected to a paging terminal 105. For two-way paging, the receivers 109 may also be included in the network, many of which are at the same locations as the paging stations 103. Stored within each pager 111 in the paging system 101 is an individual pager identifier 205 that identifies the pager as a unique pager within the organization to which it belongs.

The communications between the paging terminals, and indeed, any two components of the paging system except the pager, are carried out by means of the transfer of application protocol data units (APDUs). As noted above, in the prior art, the APDUs are transferred via unsecure IP, which may allow the malicious or even inadvertent injection of erroneous APDUs into the paging system.

As described in greater detail below, the present invention is directed towards eliminating the possibility of erroneous APDUs by validating each APDU. Thus, the present invention enhances the security of a paging system.

Figure 2:
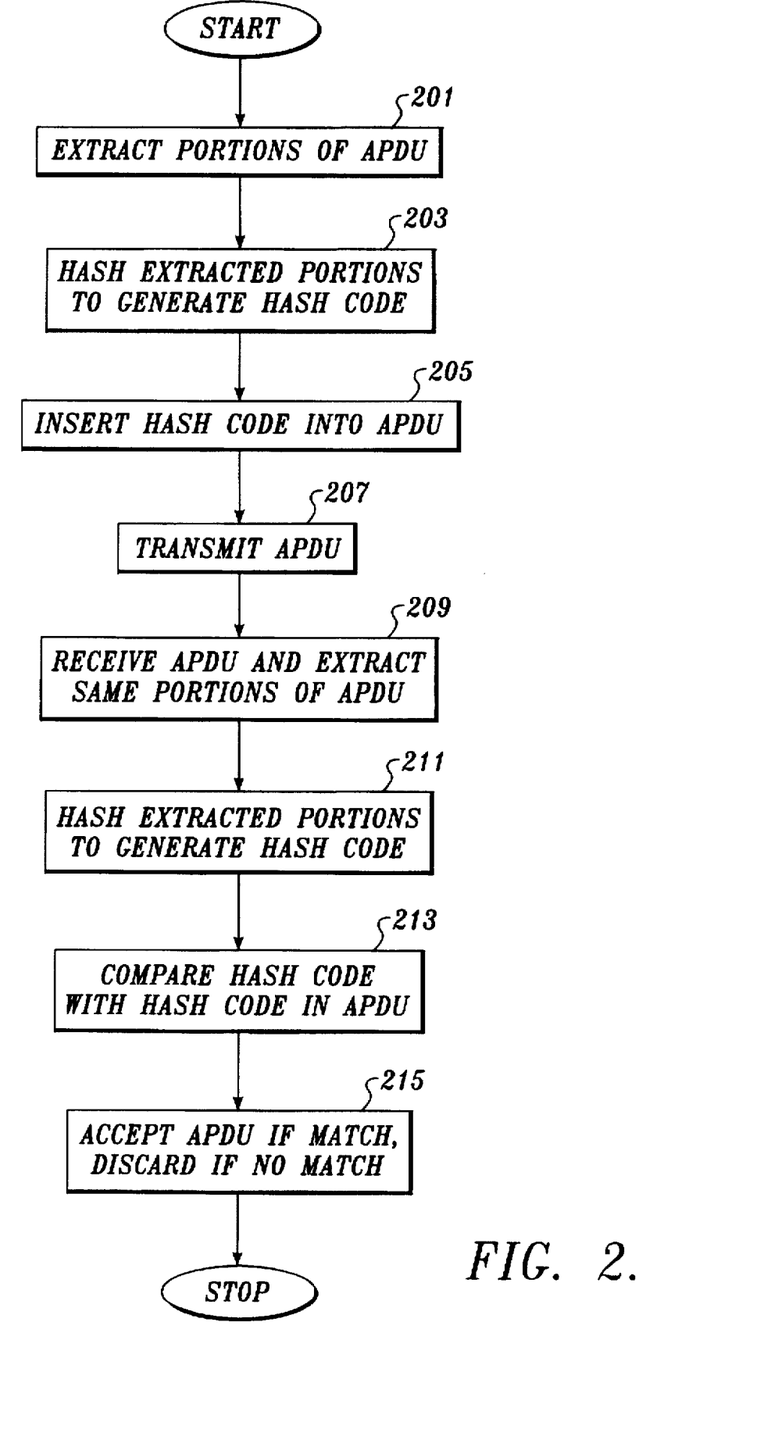
FIG. 2 is a flow diagram illustrating the method of the present invention.
Figure 4:
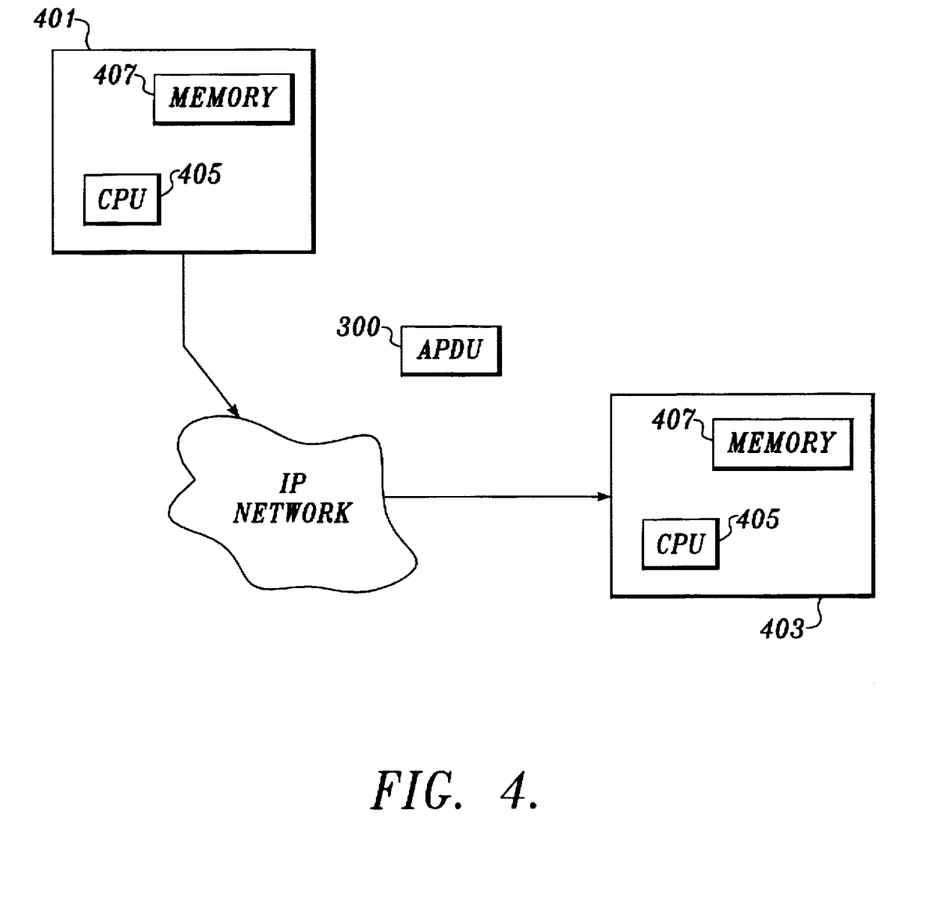
FIG. 4 is a schematic diagram of a transmitting component and a receiving component formed in accordance with the present invention.

Turning next to FIG. 2, a general overview of the method of the present invention is illustrated in flow diagram format. The method details the transmission of an APDU from a transmitting component of a paging system to a receiving component of a paging system. The transmitting component and the receiving component may be a paging terminal, receiver, paging transmitter, or transmitter controller. Referring to FIG. 4, an illustration of the transmission of an APDU 300 by a transmitting component 401 to a receiving component 403 is shown. Note that the receiving component 403 and the transmitting component 401 are represented in very generalized format to allow for the fact that any component of a paging system may be a transmitting component or a receiving component depending upon the situation.

Both the receiving component 403 and the transmitting component 401 include a CPU 405 and a memory 407. As will be seen in greater detail below, the CPU 405 performs the computations required in the method of the present invention. In the preferred embodiment, the CPU 405 is a Motorola 68060 microprocessor and the method of the present invention is implemented in the "C" programming language whose compiled output is executed by CPU 405. Memory 407 is used to store intermediate and final outputs of the computations required in the method of the present invention. Moreover, although CPU 405 and memory 407 are shown as distinct elements, they can easily be combined and the CPU 405 may use its own internal memory as memory 407. In addition, CPU 405 and memory 407 may already be present in the paging system components to perform other functions of the paging component. For example, paging terminals, transmitter controllers, and receivers all typically include several microprocessors that can also act as CPU 405 and memory 407, in addition to the microprocessor's other functions.

Figure 3:
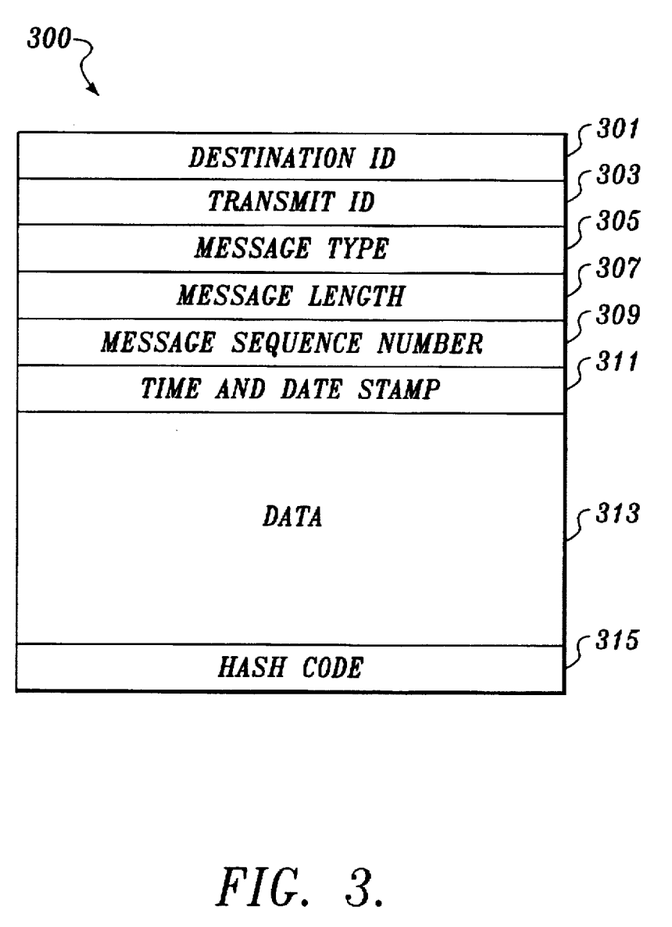
FIG. 3 is a schematic diagram of an APDU formed in accordance with the present invention.

Returning to FIG. 2, first, at box 201, predetermined portions of the APDU are extracted (the "extracted portions") from the APDU by the transmitting component. A schematic diagram of an APDU 300 is shown in FIG. 3. As seen, the APDU 300 includes several data fields that contain different types of information. It can be appreciated that not all of the fields of the APDU 300 are shown, but rather, only those fields that are germane to the present invention. For example, APDU 300 typically may include data that are ultimately destined for the pager that are not shown. The APDU 300 includes a destination ID 301, a transmit ID 303, a message type 305, a message length 307, a message sequence number 309, a time and date stamp 311, data 313, and a hash code 315.

The destination ID 301 identifies the intended receiving component. The transmit ID 303 identifies the transmitting component. The message type 305 indicates the type of data being carried by the APDU 300. It can be appreciated by those skilled in the art that the data may be paging messages, a command, a response, a status report, or other known type. The message length 307 indicates the length of the APDU 300. The message sequence number 309 is a number that identifies that particular APDU 300. The time and date stamp 311 indicates that time and date upon which the transmitting component sent the APDU 300. The data 313 is the "payload" of the APDU 300. Finally, the hash code 315, as discussed in greater detail below, is formed by the present invention to act as an authentication code.

Returning again to FIG. 2, as noted above, at box 201, predetermined portions of the APDU are extracted. In the preferred embodiment, the predetermined portions include the destination identifier, the message type, the message sequence number, the length, and the time and date of the APDU.

At box 203, the extracted portions are provided to a hash method performed by the transmitting component to generate a transmit hash code 315. The hash method used in the preferred embodiment is detailed below. Next, at box 205, the transmit hash code 315 is appended to the APDU 300 so as to be made a part of the APDU 300. At box 207, the APDU 300 (with the transmit hash code 315) is transmitted by the transmitting component to the receiving component in the paging system. The transmission of the APDU 300 may be executed by any one of the known methods of transmitting APDUs in a paging system. Examples include frame relay network, dedicated land line, or satellite transmission.

Next, at box 209, the receiving component receives the APDU 300 and also extracts precisely the same predetermined portions of the APDU 300 that were extracted by the transmitting component. Thus, both the transmitting component and the receiving component know which portions of the APDU 300 to extract. Next, at box 211, the receiving component performs the same hash method on the extracted portions as was done by the transmitting component. The output of this hash method by the receiving component is a receive hash code.

Next, at box 213, the receive hash code generated by the receiving component is compared with the transmit hash code 315 included in the APDU 300. Finally, at box 215, if the receive hash code is the same as the transmit hash code 315 included in the APDU 300, then the receiving component accepts the APDU 300 as authentic. However, if the receive hash code is not the same as the transmit hash code 315 included in the APDU 300, then the receiving component discards the APDU 300 as being erroneous.

Figure 5:
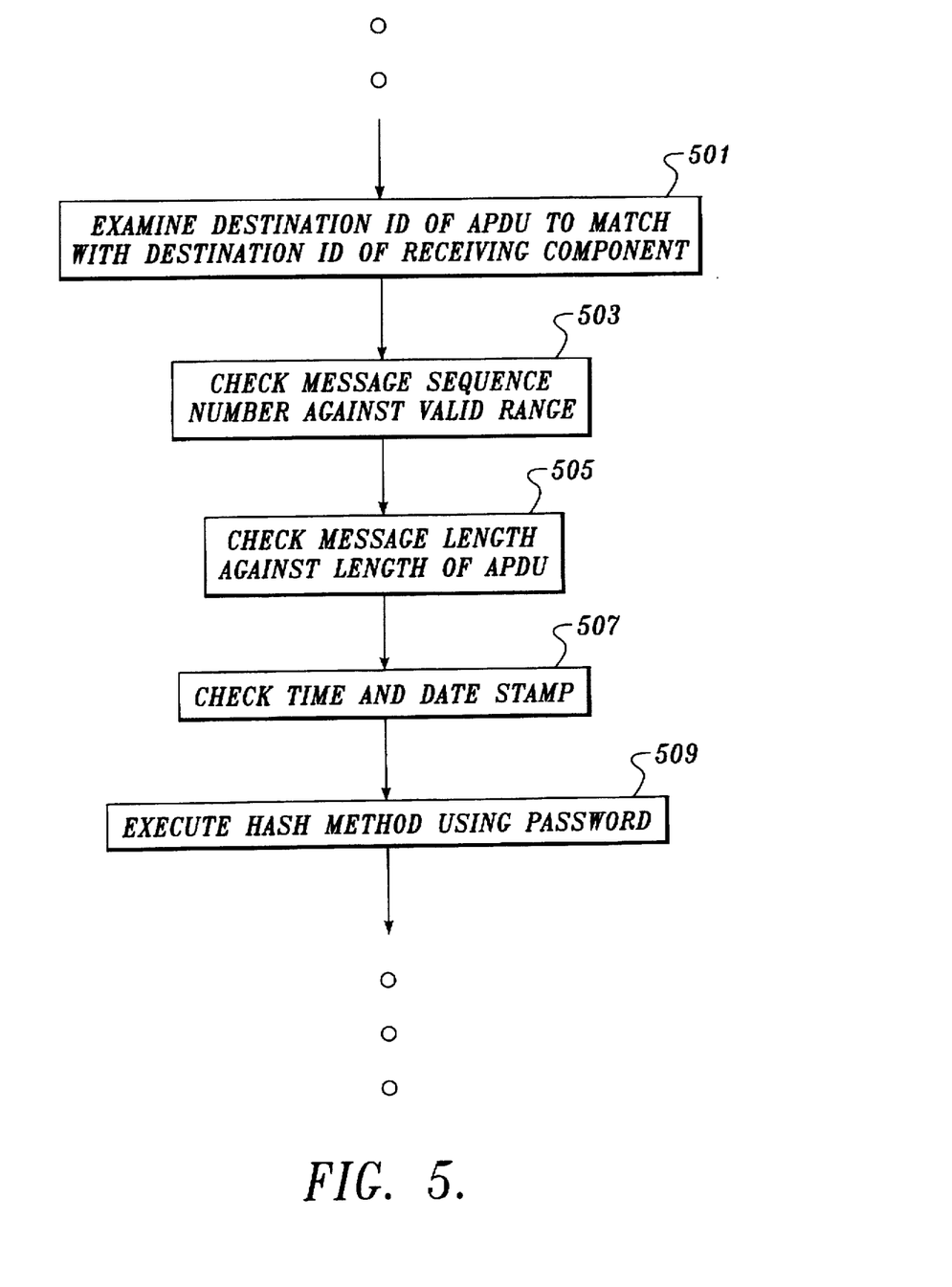
FIG. 5 is a flow diagram illustrating additional validation techniques in accordance with the present invention.

FIG. 2 illustrates the "basic" method of validating the APDU 300. In the preferred embodiment of the present invention, other techniques for ensuring that the received APDU 300 is authentic is also included. These other "auxiliary" authentication techniques are shown in FIG. 5 as inserted steps into FIG. 2. Thus, boxes 501–507 may be implemented following box 215 of FIG. 2.

Turning first to box 501, in the first additional validation check, the destination ID 301 is examined by the receiving component 403 to determine if it matches the destination ID of the receiving component 403. Typically, in a paging system, each component of the paging system is assigned an identification number by the paging service provider. If the destination ID 301 of the APDU does not match the destination ID of the receiving component 403, then the APDU 300 is discarded.

Next, at box 503, the receiving component 403 also keeps a record of the range of message sequence numbers 309 of APDUs 300 that have been received or potentially received in the past predetermined amount of time time, for example, for the past twenty-four hours. If the message sequence number 309 of the received APDU 300 falls within the range of message sequence numbers 309 that was previously received in the past twenty-four hours, then the APDU 300 is assumed to be a duplicate and discarded.

Next, at box 505, the message length 307 is examined and compared with the actual length of the APDU 300. If the message length 307 does not correspond with the actual length of the APDU 300, then the APDU 300 is discarded.

Further, at box 507, another validation technique in the preferred embodiment is the checking of the time and date stamp 311. In particular, if the time and date stamp 311 of the APDU 300 varies from the actual time and date as kept by the receiving component 403 by more than a predetermined amount of time (such as one minute), then the, APDU 300 is discarded.

Finally, at box 509, the input to the hashing method described below not only consists of the extracted portions from the APDU 300, but also a password (such as a 64-bit word). The password is not included in the APDU 300 directly, but rather has a deterministic effect upon the hash code 315 that is included in the APDU 300. In this option, the transmitting component 401 and the receiving component 403 must both have a copy of the password. The receiving component 403 then also institutes the hashing method on the password and the extracted portions of the APDU 300.

Figure 6:
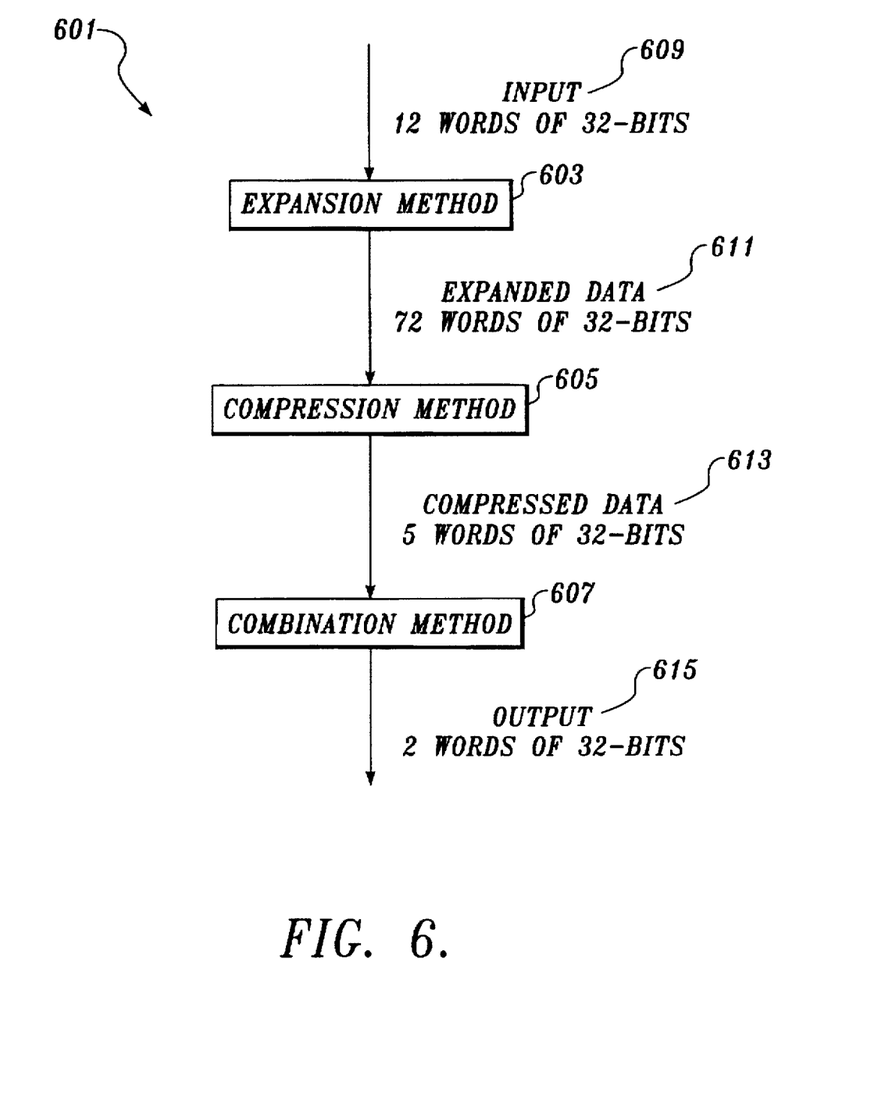
FIG. 6 is a schematic diagram of the preferred hash method used by the present invention.

Turning next to FIG. 6, a schematic diagram of the hash method performed by the CPUs 405 at the transmitting component 401 and the receiving component 403 is shown. The particular hash method used in the preferred embodiment was developed with several considerations in mind. First, the hash method must be deterministic, i.e., the hash method must provide the same output for any given input. Secondly, the hash method must be computationally inexpensive. In other words, to carry out the hash method should not require an inordinate amount of CPU resources. Finally, the hashing method must be extremely computationally expensive to reverse the hash method. By reversing the hash method, it is meant the determination of the extracted portions of the APDU 300 to be determined from the hash code 315. In the case of including a password in the extracted portions as detailed in FIG. 5, it must be extremely computationally expensive to determine the password by examining one or more of transmitted APDUs. The hashing method of the present invention satisfies these above requirements.

The hashing method requires an input of 384 bits (the extracted portions) and provides a hash code 315 of 64 bits in length. Both the input to the hash method and the outputted hash code 315 are grouped in 32-bit words. Thus, the input is twelve (12) 32-bit words and the hash code 315 is two (2) 32-bit words.

Referring to FIG. 6, the hashing method 601 consists of three components: an expansion method 603, a compression method 605, and a combination method 607. The expansion method 603 acts upon the 12 32-bit words of the input data 609 and produces 72 32-bit words of expanded data 611 by combining a specified set of input words 609, using exclusive-or operations, to produce each expanded word.

The compression method 605 acts upon the 72 32-bit words of the expanded data 611 and produces five 32-bit words of compressed data 613. This is done by first initializing five words of storage to specified values, then performing a short sequence of operations, for each expanded data word, that combines the expanded data word and the contents of the five words or storage so as to modify the contents of the five words of storage. After all 72 expanded data words have been processed, the contents of the five words of storage become the compressed data 613.

The combination method 607 acts upon the five words of compressed data 613 and produces two 32-bit words of output data 615, by performing a weighted sum, modulo $2^{32}$, on the compressed data words.

Before proceeding with the details of the hash method, it is helpful to provide a definition for the various binary operations and the notation used herein. In these definitions, A and B are 32 bit words.

A=B The 32-bit value B is assigned to the 32-bit storage area named A.

A+B The 32-bit value B is added to the 32-bit value A using unsigned arithmetic, modulo $2^{32}$, to produce a 32-bit result.

A–B The 32-bit value B is subtracted from the 32-bit value A using unsigned arithmetic, modulo $2^{32}$, to produce a 32-bit result. It should be noted that "A –B" is equivalent to "A+~B+1" and alternative embodiments may use this fact.

A^B The 32-bit value B is multiplied by the 32-bit value A using unsigned arithmetic, modulo $2^{32}$, to produce a 32-bit result. -A The 32-bit value A is subjected to bitwise logical negation to produce a 32-bit result; that is, each bit that is a one becomes a zero in the result and each bit that is a zero becomes a one. It should be noted that "~A" is equivalent to "~0–A" (where "~0" is the value of –1 or all one bits) and alternative embodiments may use this fact.

A & B The 32-bit value A is bitwise ANDed with the 32-bit value B to produce a 32-bit result; that is, A and B are examined and if the least significant bit of both is a one then the least significant bit of the result will be a one. The other 31 bits of A and B are treated the same way to generate the other 31 bits of the result. It should be noted that "A & B" is equivalent to "~(~A|~B)" and alternative embodiments may use this fact.

A|B The 32-bit value A is bitwise ORed with the 32-bit value B to produce a 32-bit result; that is, A and B are examined and if the least significant bit of either is a one then the least significant bit of the result will be a one. The other 31 bits of A and B are treated the same way to generate the other 31 bits of the result. It should be noted that "A|B" is equivalent to "~(~A & ~B)" and alternative embodiments may use this fact.

A^B The 32-bit value A is bitwise exclusive-ORed with the 32-bit value B to produce a 32-bit result; that is, A and B are examined and if the least significant bit of A is different from the least significant bit of B then the least significant bit of the result will be a one. The other 31 bits of A and B are treated the same way to generate the other 31 bits of the result. It should be noted that "A ^ B" is equivalent to "(A & ~B) I (~A & B)" and also "~((~A|B) & (A|~B))" and alternative embodiments may use these facts.

A<<B The 32-bit value A is shifted left B bits to produce a 32-bit result; that is, the least significant B bits of the result are zero, the most significant B bits of A are discarded, and the remaining bits of A become the most significant bits of the result. It should be noted that "A<<B" is equivalent to "A*$2^B$", and alternative embodiments may use this fact. Also, "A<<1" is equivalent to "A+A" and alternative embodiments may perform this operation B times to obtain the same result.

A>>B The 32-bit value A is shifted right B bits to produce a 32-bit result; that is, the most significant B bits of the result are zero, the least significant B bits of A are discarded, and the remaining bits of A become the least significant bits of the result. It should be noted that "A>>B" is equivalent to dividing A by $2^B$, discarding any fraction, and alternative embodiments may use this fact. Also, "A>>1" is equivalent to dividing A by 2, discarding any fraction, and alternative embodiments may perform this operation B times to obtain the same result.

It should be noted that "(A<<B)+(A>>(32-B))" or "(A<<B)|(A>>(32-B))" or "(A<<B)^(A>>(32-B))" are all equivalent to rotating A to the left by B bits; that is, permuting the bits of A so that the B most significant bits of A become the least significant bits of the result and the remaining bits of A become the most significant bits of the result. Some alternative embodiments, particularly those using hardware logic rather than software, may use this equivalence to obtain the same result.

There are many other theorems of binary arithmetic and boolean logic, well known to those skilled in the art, which may be used to produce alternative embodiments that are trivially different from the preferred embodiment and produce exactly the same numerical result.

With the basic operational definitions complete, a description of the hashing method is presented. The input to the hashing method is an array of 12 words, each of 32 bit length. The 12 words are named in[0] through in[11] for ease of description herein. The output hash code 315 is two words of 32 bits length called herein out[0] and out[1].

An "expansion array" of storage of 72 words, each of 32 bit length, is denoted as ex[0] through ex[71]. In addition, six processor registers of CPU 405 are used to store six words, denoted as r0, r1, r2, r3, r4, and rx.

Figure 7:
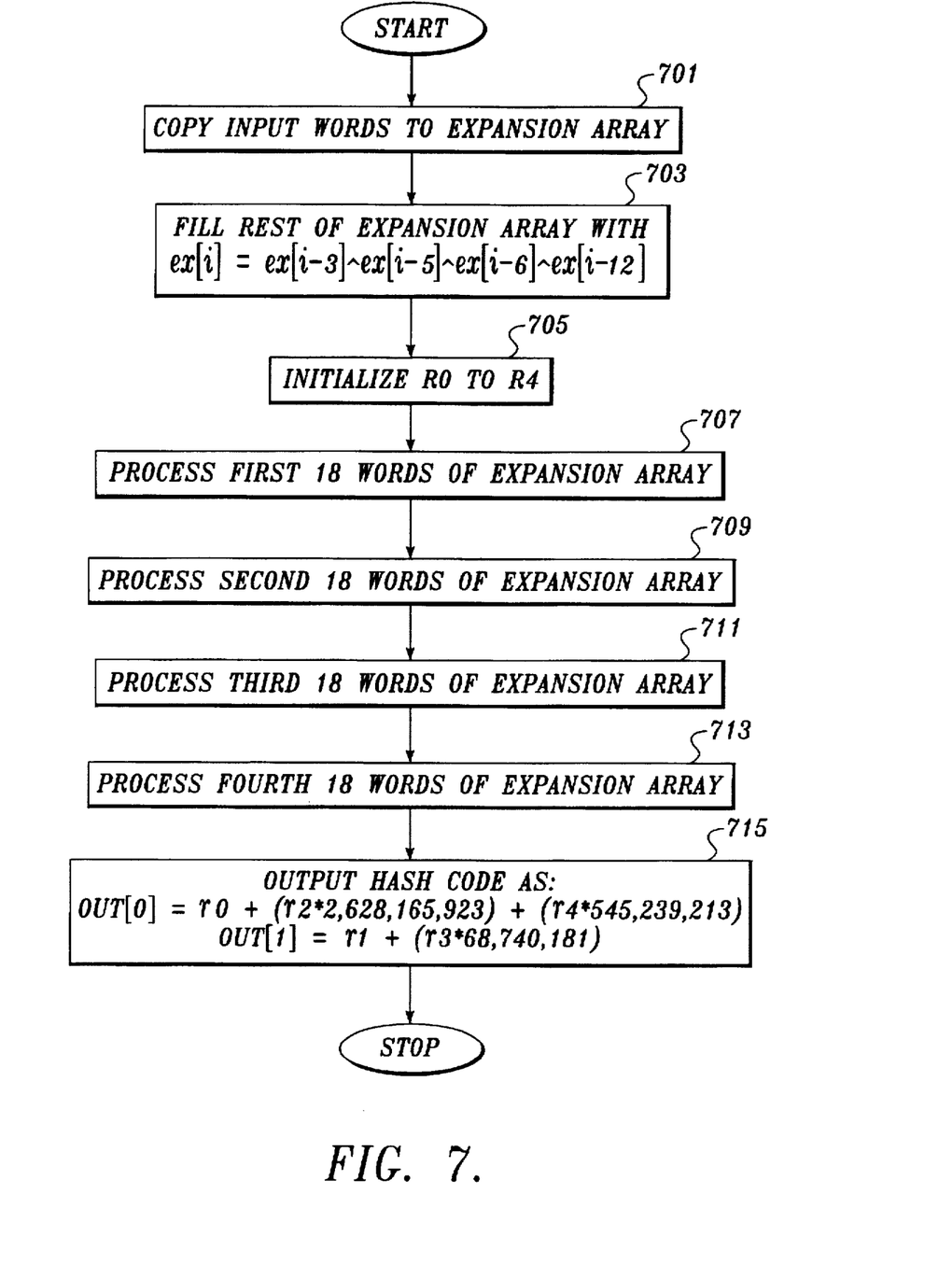
FIG. 7 is a flow diagram illustrating the preferred hash method used by the present invention.

Turning to FIG. 7, a flow diagram of the hash method shows each step of the process. The expansion method consists of two steps. The first step, at box 701, of the hash method copies the input (the extracted portions) to the first 12 words in the expansion array; i.e., repeating the following operation with i set to 0, 1, 2, etc., up to 11.

$$ex[i]=in[i] \qquad \text{Eq. (1)}$$

The next step, at box 703, of the method fills the remainder of the expansion array by repeating the following operations with i set to 12, 13, 14, etc., up to 71.

$$ex[i]=ex[i-3]\hat{\ }ex[i-5]\hat{\ }ex[i-6]\hat{\ }ex[i-12] \qquad \text{Eq. (2)}$$

Equation (2) is linearly decomposable. Thus, as an alternative embodiment, each word in the expansion array may be directly calculated from the input array, as follows:

ex[0]=in[0]
ex[1]=in[1]
ex[2]=in[2]
ex[3]=in[3]
ex[4]=in[4]
ex[5]=in[5]
ex[6]=in[6]
ex[7]=in[7]
ex[8]=in[8]
ex[9]=in[9]
ex[10]=in[10]
ex[11]=in[11]
ex[12]=in[0]^in[6]|in[7]^in[9]
ex[13]=in[1]^in[7]|in[8]^in[10]
ex[14]=in[2]^in[8]^in[9]^in[11]
ex[15]=in[0]^in[3]^in[6]^in[7]^in[10]
ex[16]=in[1]^in[4]^in[7]^in[8]^in[11]
ex[17]=in[0]^in[2]^in[5]^in[6]^in[7]^in[8]
ex[18]=in[1]^in[3]^in[6]^in[7]^in[8]^in[9]
ex[19]=in[2]^in[4]^in[7]^in[8]^in[9]^in[10]
ex[20]=in[3]^in[5]^in[8]^in[9]^in[10]^in[11]
ex[21]=in[0]^in[4]^in[7]^in[10]^in[11]
ex[22]=in[0]^in[1]^in[5]^in[6]^in[7]^in[8]^in[9]^in[11]
ex[23]=in[0]^in[1]^in[2]^in[8]^in[10]
ex[24]=in[1]^in[2]^in[3]^in[9]^in[11]
ex[25]=in[0]^in[2]^in[3]^in[4]^in[6]^in[7]^in[9]^in[10]
ex[26]=in[1]^in[3]^in[4]^in[5]^in[7]^in[8]^in[10]^in[11]
ex[27]=in[0]^in[2]^in[4]^in[5]^in[7]^in[8]^in[11]
ex[28]=in[0]^in[1]^in[3]^in[5]^in[7]^in[8]
ex[29]=in[1]^in[2]^in[4]^in[6]^in[8]^in[9]
ex[30]=in[2]^in[3]^in[5]^in[7]^in[9]^in[10]
ex[31]=in[3]^in[4]^in[6]^in[8]^in[10]^in[11]
ex[32]=in[0]^in[4]^in[5]^in[6]^in[11]
ex[33]=in[0]^in[1]^in[5]^in[9]
ex[34]=in[1]^in[2]^in[6]^in[10]
ex[35]=in[2]^in[3]^in[7]^in[11]
ex[36]=in[0]^in[3]^in[4]^in[6]^in[7]^in[8]^in[9]
ex[37]=in[1]^in[4]^in[5]^in[7]^in[8]^in[9]^in[10]
ex[38]=in[2]^in[5]^in[6]^in[8]^in[9]^in[10]^in[11]
ex[39]=in[0]^in[3]^in[10]^in[11]
ex[40]=in[0]^in[1]^in[4]^in[6]^in[7]|in[9]^in[11]
ex[41]=in[0]^in[1]^in[2]^in[5]^in[6]^in[8]^in[9]^in[10]
ex[42]=in[1]^in[2]^in[3]^in[6]^in[7]^in[9]^in[10]^in[11]
ex[43]=in[0]^in[2]^in[3]^in[4]^in[6]^in[8]^in[9]^in[10]^in[11]
ex[44]=in[0]^in[1]^in[3]^in[4]^in[5]^in[6]^in[10]^in[11]
ex[45]=in[0]^in[1]^in[2]^in[4]^in[5]^in[9]^in[11]
ex[46]=in[0]^in[1]^in[2]^in[3]^in[5]^in[7]^in[9]^in[10]
ex[47]=in[1]^in[2]^in[3]^in[4]^in[6]^in[8]^in[10]^in[11]
ex[48]=in[0]^in[2]^in[3]^in[4]^in[5]^in[6]^in[11]
ex[49]=in[0]^in[1]^in[3]^in[4]^in[5]^in[9]
ex[50]=in[1]^in[2]^in[4]^in[5]^in[6]^in[10]
ex[51]=in[2]^in[3]^in[5]^in[6]^in[7]^in[11]
ex[52]=in[0]^in[3]^in[4]^in[8]^in[9]
ex[53]=in[1]^in[4]^in[5]^in[9]^in[10]
ex[54]=in[2]^in[5]^in[6]^in[10]^in[11]
ex[55]=in[0]^in[3]^in[9]^in[11]

ex[56]=in[0]^in[1]^in[4]^in[6]^in[7]^in[9]^in[10]
ex[57]=in[1]^in[2]^in[5]^in[7]^in[8]^in[10]^in[11]
ex[58]=in[0]^in[2]^in[3]^in[7]^in[8]^in[11]
ex[59]=in[0]^in[1]^in[3]^in[4]^in[6]^in[7]^in[8]
ex[60]=in[1]^in[2]^in[4]^in[5]^in[7]^in[8]^in[9]
ex[61]=in[2]^in[3]^in[5]^in[6]^in[8]^in[9]^in[10]
ex[62]=in[3]^in[4]^in[6]^in[7]^in[9]^in[10]^in[11]
ex[63]=in[0]^in[4]^in[5]^in[6]^in[8]^in[9]^in[10]^in[11]
ex[64]=in[0]^in[1]^in[5]^in[10]^in[11]
ex[65]=in[0]^in[1]^in[2]^in[7]^in[9]^in[11]
ex[66]=in[0]^in[1]^in[2]^in[3]^in[6]^in[7]^in[8]^in[9]^in[10]
ex[67]=in[1]^in[2]^in[3]^in[4]^in[7]^in[8]^in[9]^in[10]^in[11]
ex[68]=in[0]^in[2]^in[3]^in[4]^in[5]^in[6]^in[7]^in[8]^in[10]^in[11]
ex[69]=in[0]^in[1]^in[3]^in[4]^in[5]^in[8]^in[11]
ex[70]=in[0]^in[1]^in[2]^in[4]^in[5]^in[7]
ex[71]=in[1]^in[2]^in[3]^in[5]^in[6]^in[8]

The first step of the compression method 605 is to initialize the five words of storage (processor registers in the preferred embodiment) at box 705:

r0=3,822,118,087
r1=4,206,368,529
r2=2,636,563,960
r3=1,419,098,426
r4=742,554,211

At box 707, the compression method 605 processes the first 18 words of the expansion array by repeating the following operations with i set to 0, 1, 2, etc., up to 17:

rx=ex[i]–r0+((r1 & r2)|(r1 & r3) (r2 & r3))+(r4<<11)+(r4>>21)+2,049,053,871
r0=r1
r1=r2
r2=(r3<<27)+(r3>>5)
r3=r4
r4=rx

Next, at box 709, the compression method 605 processes the second 18 words of the expansion array by repeating the following operations with i set to 18, 19, 20, etc., up to 35:

rx=ex[i]–r0+((r1 & r2)|(r1 & r3))+(r4<<11)+(r4>>21)+909,867,182
r0=r1
r1=r2
r2=(r3<<27)+(r3>>5)
r3=r4
r4=rx

Next, at box 711, the compression method 605 processes the third 18 words of the expansion array by repeating the following operations with i set to 36, 37, 38, etc., up to 53:

rx=ex[i]–r0+((r1 & r2 & r3)–(r1|(r2 & r3)))+(r4<<11)+(r4>>21) +2,073,245,137
r0=r1
r1=r2
r2=(r3<<27)+(r3>>5)
r3=r4
r4=rx

Finally, at box 713, the compression method 605 processes the last 18 words of the expansion array by repeating the following operations with i set to 54, 55, 56, etc., up to 71:

rx=ex[i]–r0+((r1 & (r2 ^r3)) |~(r1|r2))+(r4<<11)+(r4>>21)+4,157,358,317
r0=r1
r1=r2
r2=(r3<<27)+(r3>>5)
r3=r4
r4=rx

As an alternative embodiment, the "expansion" and "compression" stages described above may be combined using "pipelining." Thus, each word stored in the expansion array need not be calculated until it is required as input to a compression stage. This alternative embodiment would reduce the storage requirements of the hashing method (because it would eliminate the expansion array and only require storage for the last 12 words generated by the combining method).

Finally, at box 715, the combining method 607 of the hashing method combines the contents of the storage words r0 to r4 to form the two output words using the following operations, which is a weighted sum module 232:

out[0]=r0+(r2*2,628,165,923)+(r4*545,239,213)
out[1]=r1+(r3*68,740,181)

The combination of out[0] and out[1] is the hash code 315 inserted into the APDU 300.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for validating a data packet transmitted between components of a paging infrastructure system, the paging infrastructure system including at least a transmitting component and a receiving component, said data packet being an application protocol data unit (APDU) that includes a destination ID a message sequence number, a message length, and a time and date stamp, the method comprising the steps of:

(a) extracting predetermined portions of the data packet for hashing by the transmitting component;

(b) performing a hash method on said predetermined portions of the data packet to generate a transmit hash code, wherein said predetermined portions include said destination ID, said message sequence number, said message length, and said time and date stamp;

(c) inserting said transmit hash code into the data packet;

(d) transmitting the data packet to said receiving component;

(e) extracting said predetermined portions of the data packet for hashing by the receiving component;

(f) performing said hash method on said predetermined portions of the data packet to generate a receive hash code;

(g) comparing said receive hash code with said transmit hash code; and (h) accepting the data packet if there is a match between said receive hash code and said transmit hash code.

2. The method of claim 1 wherein said receiving component has a receive component destination ID and further including the step of examining the destination ID of said APDU and accepting said APDU only if said the destination ID of said APDU matches said receive component destination ID.

3. The method of claim 1 further including the step of examining said message length of said APDU and accepting said APDU only if said message length of said APDU matches the actual length of said APDU.

4. The method of claim 1 further including the step of having the receiving component maintain a record of a valid range of said message sequence numbers of APDUs previously received within a predetermined amount of time and discarding any newly received APDU that has a message sequence number outside of said valid range.

5. The method of claim 1 wherein said receiving component maintains a clock and further including the step of examining the time and date stamp of said APDU and accepting said APDU only if said the time and date stamp of said APDU is within a predetermined time from the time and date as indicated by said clock.

6. The method of claim 1 wherein said step of performing said hash method by said transmitting component is done on said predetermined portions and a password and said step of performing said hash method by said receiving component is done on said predetermined portions and said password.

7. The method of claim 6 wherein said predetermined portions include said destination ID, said message sequence number, said message length, and said time and date stamp.

8. The method of claim 6 wherein said receiving component has a receive component destination ID and further including the step of examining the destination ID of said APDU and accepting said APDU only if said the destination ID of said APDU matches said receive component destination ID.

9. The method of claim 6 further including the step of examining said message length of said APDU and accepting said APDU only if said message length of said APDU matches the actual length of said APDU.

10. The method of claim 6 further including the step of having the receiving component maintain a record of a valid range of said message sequence numbers of APDUs previously received within a predetermined amount of time and discarding any newly received APDU that has a message sequence number outside of said valid range.

11. The method of claim 6 wherein said receiving component maintains a clock and further including the step of examining the time and date stamp of said APDU and accepting said APDU only if said the time and date stamp of said APDU is within a predetermined time from the time and date as indicated by said clock.

12. A method for securely transmitting a data packet between components of a paging infrastructure system, the paging infrastructure system including at least a transmitting component and a receiving component, the method comprising the steps of:

(a) extracting predetermined portions of the data packet for hashing by the transmitting component, said predetermined portions comprising input words of thirty-two bits;

(b) performing a hash method on said predetermined portions of the data packet to generate a transmit hash code, said hash method comprising the steps of:

(i) expanding said input words into an expanded set of words, each of said words of said expanded set being a combination of said input words using exclusive-or operations;

(ii) initializing a set of storage words;

(iii) modifying said set of storage words by evenly dividing said expanded set of words into four groups of words to be processed sequentially combining all said storage words with all words of one group using rotations, additions, and subtractions in combination with a different non-linear Boolean operation for each group, and storing the results into said storage words and repeating for each group;

(iv) combining said set of storage words into said transmit hash code using a weighted sum;

(c) inserting said transmit hash code into the data packet;

(d) transmitting the data packet to said receiving component;

(e) extracting said predetermined portions of the data packet for hashing by the receiving component;

(f) performing said hash method on said predetermined portions of the data packet to generate a receive hash code;

(g) comparing said receive hash code with said transmit hash code; and (h) accepting the data packet if there is a match between said receive hash code and said transmit hash code.

13. The method of claim 12 wherein said input words are twelve 32-bit words, said expanded set is seventy-two 32-bit words, and said set of storage words includes five 32-bit words.

* * * * *